US012698215B2

(12) United States Patent
Beierling et al.

(10) Patent No.: US 12,698,215 B2
(45) Date of Patent: Aug. 4, 2026

(54) METHOD FOR MAKING PRECURSORS OF CATHODE ACTIVE MATERIALS FOR LITHIUM ION BATTERIES

(71) Applicant: BASF SE, Ludwigshafen am Rhein (DE)

(72) Inventors: Thorsten Beierling, Ludwigshafen (DE); Sabine Frischhut, Ludwigshafen (DE); Matthias Rauls, Ludwigshafen (DE); Lukas Karl Metzger, Ludwigshafen (DE); Sabine Weiguny, Ludwigshafen (DE); Michael Lennartz, Ludwigshafen (DE); Rafael Benjamin Berk, Ludwigshafen (DE)

(73) Assignee: BASF SE, Ludwigshafen am Rhein (DE)

(*) Notice: Subject to any disclaimer, the term of this patent is extended or adjusted under 35 U.S.C. 154(b) by 212 days.

(21) Appl. No.: 18/570,726

(22) PCT Filed: Jul. 12, 2022

(86) PCT No.: PCT/EP2022/069469
§ 371 (c)(1),
(2) Date: Dec. 15, 2023

(87) PCT Pub. No.: WO2023/285464
PCT Pub. Date: Jan. 19, 2023

(65) Prior Publication Data

US 2024/0425385 A1 Dec. 26, 2024

(30) Foreign Application Priority Data

Jul. 16, 2021 (EP) .................................... 21186219
Sep. 21, 2021 (EP) .................................... 21198018

(51) Int. Cl.
*H01B 1/08* (2006.01)
*C01G 53/40* (2025.01)
*H01M 4/58* (2010.01)

(52) U.S. Cl.
CPC ............... *C01G 53/40* (2013.01); *H01B 1/08* (2013.01); *H01M 4/58* (2013.01);
(Continued)

(58) Field of Classification Search
CPC .. H01B 1/00; H01B 1/08; H01M 4/58; C01G 45/03; C01G 51/05; C01G 53/05; C01G 53/40; C01G 53/50; C01G 53/502
See application file for complete search history.

(56) References Cited

U.S. PATENT DOCUMENTS 9,935,315 B2 * 4/2018 Young ..................... H01M 4/52
10,547,052 B2 * 1/2020 Toma ..................... H01M 4/364
(Continued)

FOREIGN PATENT DOCUMENTS

CN 112996753 A 6/2021
CN 114096486 A * 2/2022
(Continued)

OTHER PUBLICATIONS

Axmann et al "Nickel hydroxide as a matrix for unusual valencies: the electrochemical behaviour of metal(III)-ion-substituted nickel hydroxides of the pyroaurite type", Journal of Alloys and Compounds 246 (1997) 232-241.*
Trotochaud et al., "Nickel-Iron Oxyhydroxide Oxygen-Evolution Electrocatalysts: The Role of Intentional and Incidental Iron Incorporation", J. Am. Chem. Soc., vol. 136, pp. 6744-6753 (2014).
(Continued)

*Primary Examiner* — Mark Kopec
(74) *Attorney, Agent, or Firm* — Armstrong Teasdale LLP

(57) ABSTRACT

Disclosed herein is a process for making a particulate (oxy)hydroxide of TM, where TM represents a combination of metals and includes nickel and at least one metal selected from cobalt and aluminum and manganese. The process includes:

(Continued)

(a) combining an aqueous slurry of metallic nickel and at least one metal selected from aluminum and transition metals other than nickel with an oxidant selected from oxygen and nitrate in a first reaction vessel or in a first group of reaction vessels at a temperature of from 5° to 40° C., (b) transferring aqueous reaction medium from the first reaction vessel to a second reaction vessel, where the second reaction vessel contains a slurry of a hydroxide of TM, (c) removing the particles from step (b) from the liquid by a solid-liquid separation method, and drying the particles, and (d) returning liquid phase obtained in step (c) to the first reaction vessel.

13 Claims, 3 Drawing Sheets

(52) U.S. Cl.
CPC ...... *C01P 2002/52* (2013.01); *C01P 2004/03* (2013.01); *C01P 2006/40* (2013.01)

(56) References Cited

U.S. PATENT DOCUMENTS

| | | | | |
|---|---|---|---|---|
| 10,858,265 | B2 * | 12/2020 | Honma | H01M 10/052 |
| 11,220,438 | B2 * | 1/2022 | Yoshida | C01G 53/82 |
| 11,502,296 | B2 * | 11/2022 | Kalo | C01G 53/42 |
| 2024/0351912 | A1 * | 10/2024 | Frischhut | C01G 53/42 |

FOREIGN PATENT DOCUMENTS

| | | | | |
|---|---|---|---|---|
| JP | H10324524 | A | | 12/1998 |
| JP | 2011105588 | A | | 6/2011 |
| JP | 2019040681 | A | * | 3/2019 |
| KR | 20200133346 | A | * | 11/2020 |
| WO | 2019181787 | A1 | | 9/2019 |
| WO | 2019191837 | A1 | | 10/2019 |
| WO | 2020175925 | A1 | | 9/2020 |

OTHER PUBLICATIONS

Hall et al. "Nickel hydroxides and related materials: a review of their structures, synthesis and properties," Proceedings of the Royal Society A: Mathematical, Physical and Engineering Sciences, 471(2174), Dec. 24, 2014, pp. 1-65.

International Search Report and Written Opinion for corresponding PCT/EP22/69469 mailed Oct. 28, 2022, 10 pages.

* cited by examiner

METHOD FOR MAKING PRECURSORS OF CATHODE ACTIVE MATERIALS FOR LITHIUM ION BATTERIES

CROSS-REFERENCE TO RELATED APPLICATIONS

This application is a U.S. National Phase Application of International Patent Application No. PCT/EP22/69469, filed Jul. 12, 2022, which claims priority to European Patent Application No. 21198018.0, filed Sep. 21, 2021, and European Patent Application No. 21186219.8, filed Jul. 16, 2021, each of which is hereby incorporated by reference herein.

The present invention is directed towards a process for making a particulate (oxy)hydroxide of TM wherein TM represents a combination of metals, and wherein TM comprises nickel and at least one metal selected from cobalt and aluminum and manganese, wherein said process comprises the steps of:

(a) combining an aqueous slurry of metallic nickel and at least one metal selected from aluminum and transition metals other than nickel with an oxidant selected from oxygen, peroxide and nitrate in a first reaction vessel or in a first group of reaction vessels at a temperature of from 5° to 40° C., (b) transferring aqueous reaction medium from step (a) to a second reaction vessel, wherein said second reaction vessel contains a slurry of a hydroxide of TM, wherein the pH value in step (b) is higher than in step (a) and the temperature is in the range of from 45° to 80° C., thereby forming and growing particles of hydroxide of TM, (c) removing the particles from step (b) from the liquid by a solid-liquid separation method, and drying the particles, (d) returning liquid phase obtained in step (c) to the first reaction vessel.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides.

The cathode material is of crucial importance for the properties of a lithium ion battery. Lithium-containing mixed transition metal oxides have gained particular significance, for example spinels and mixed oxides of layered structure, especially lithium-containing mixed oxides of nickel, manganese and cobalt; see, for example, EP 1 189 296. Such lithium-containing mixed oxides of nickel, manganese and cobalt are generally prepared in a two-stage process. In a first stage, a sparingly soluble salt of the transition metal(s) is prepared by precipitating it from a solution, for example a carbonate or a hydroxide. This sparingly soluble compound is in many cases also referred to as a precursor. In a second stage, the precursor is mixed with a lithium compound, for example $Li_2CO_3$, LiOH or $Li_2O$, and calcined at high temperatures, for example at 600 to 1100° C.

In the precursor manufacturing process, when performed by (co-)precipitation, usually the sulfates of transition metals such as nickel, cobalt and manganese are used as starting materials. This leads, however, to the formation of stoichiometric amounts of alkali metal sulfates. The stoichiometric amounts of sulfate are undesired by-products that need to be disposed of.

In WO 2019/191837, a process is disclosed wherein cathode active materials are made from precursors that are made by oxidation of metals and simultaneous precipitation. The process, however, leads to disadvantages when manganese is present because under the prevailing alkaline conditions, manganese may be precipitated as $MnO_2$ that is not incorporated well into the precursor. In addition, the magnetic separation as suggested for the removal of unreacted metals does not work for many materials such as, but not limited to aluminum and manganese.

It was therefore an objective of the present invention to provide a process for precursor manufacture that avoids the formation of stoichiometric amounts of alkali metal sulfate and that further reduces the formation of residues of unreacted metals that cannot be removed magnetically. In particular, it was the objective to provide a process that allows manganese as a constituent.

Inventive process or process according to the (present) invention. The inventive process may be carried out as a batch process or as a continuous or semi-batch process.

The inventive process comprises steps (a) to (d), hereinafter also referred to as (a), (b), (c) or (d), respectively. Steps (a) to (d) shall be described in more detail below.

The inventive process is suitable for making a particulate (oxy)hydroxide of TM wherein TM represents metals, and wherein TM comprises nickel and at least one metal selected from cobalt and aluminum and manganese. Preferably, TM comprises at least 50 mol-% nickel. More preferably, TM comprises at least 50 mol-% nickel and at least one of manganese and aluminum.

In one embodiment of the present invention, particulate (oxy)hydroxide of TM is selected from hydroxides and oxyhydroxides of TM wherein TM is a combination of metals according to general formula (I)

$$(Ni_aCo_bMn_c)_{1-d}M_d \quad (I)$$

with a being in the range of from 0.6 to 0.95, preferably 80 to 94, b being in the range of from zero to 0.2, preferably 0.01 to 0.12, c being in the range of from zero to 0.2, preferably 0.02 to 0.10, d being in the range of from zero to 0.1, M is selected from Mg, Al, Ti, Zr, Mo, W, Al, Mg, Nb, and Ta, and combinations of at least two of the foregoing, preferably, M is selected from Mg and Al.

$$a+b+c=1, \text{ and } c+d>\text{zero}.$$

Said particulate (oxy)hydroxide of TM may contain traces of further metal ions, for example traces of ubiquitous metals such as sodium, calcium, iron or zinc, as impurities but such traces will not be taken into account in the description of the present invention. Traces in this context will mean amounts of 0.05 mol-% or less, referring to the total metal content of TM.

Particulate (oxy)hydroxide of TM is in particulate form. In one embodiment of the present invention, the mean particle diameter (D50) of particulate (oxy)hydroxide of TM is in the range of from 2 to 20 μm, preferably 3 to 16 μm, more preferably 7 to 14 μm. The mean particle diameter (D50) in the context of the present invention refers to the median of the volume-based particle diameter, as can be determined, for example, by light scattering. In one embodiment, the particulate (oxy)hydroxide of TM has a monomodal particle diameter distribution. In other embodiments, the particle distribution of the particulate (oxy)hydroxide of TM may be bimodal, for example with one maximum in the range of from 1 to 5 μm and a further maximum in the range of from 7 to 16 μm. Monomodal is preferred.

In another embodiment of the present invention the mean particle diameter (D50) of particulate (oxy)hydroxide of TM is in the range of from 1 to 7 μm, preferably 2 to 6 μm, more preferably 3 to 5 μm.

The particle shape of the secondary particles of said particulate (oxy)hydroxide of TM is preferably spheroidal, that are particles that have a spherical shape. Spheroidal shall include not just those which are exactly spherical but also those particles with a form factor in the range of from 0.7 to 1 and an axis ratio of the bounding box in the range of from 1.00 to 1.25. To determine the axis ratio of the bounding box of a specific particle, the smallest possible, rectangular bounding box is set around the top view SEM image of a particle. The axis ratio is calculated from the length of the two sides $a_1$ and $a_2$ (with $a_1 \geq a_2$) by: axis ratio of the bounding box$=a_1/a_2$.

While a perfect sphere would possess an axis ratio of the bounding box of 1.0, all deviations from perfect sphericity lead to an axis ratio>1.0.

To determine form factor and axis ratio of samples, both properties are first determined for at least 50 individual particles of each sample and then averaged. The form factor of the individual particles is calculated from the perimeter and area determined from top view SEM images: Form factor$=(4\pi\cdot\text{area})/(\text{perimeter})^2$. While a perfect sphere would possess a form factor of 1.0, any deviation from perfect sphericity leads to form factors less than 1.0.

In one embodiment of the present invention, said particulate (oxy)hydroxide of TM is comprised of secondary particles that are compose of primary particles. Preferably, said precursor is comprised of spherical secondary particles that are agglomerates of primary particles. Even more preferably, said precursor is comprised of spherical secondary particles that are agglomerates of plate-shaped, rod-shaped or needle-shaped primary particles or platelets.

In one embodiment of the present invention, said particulate (oxy)hydroxide of TM comprises a certain amount, for example 0.1 to 10 mol-% referring to TM, of metal in the oxidation state zero, for example nickel, said metal being a constituent of TM. Said metal in the oxidation state of zero and especially nickel is incorporated in the form of small particles of a maximum size of the particulate (oxy)hydroxide itself.

In one embodiment of the present invention, said particulate (oxy)hydroxide of TM may have a particle diameter distribution span in the range of from 0.5 to 0.9, the span being defined as [(D90)−(D10)] divided by (D50), all being determined by LASER analysis. In another embodiment of the present invention, said precursor may have a particle diameter distribution span in the range of from 1.1 to 1.8.

In one embodiment of the present invention the specific surface (BET) of said precursor is in the range of from 2 to 10 $m^2/g$ or even 15 to 100 $m^2/g$, determined by nitrogen adsorption, for example in accordance with to DIN-ISO 9277:2003-05.

In one embodiment of the present invention, in XRD spectra of said particulate (oxy)hydroxides of TM, the intensity of the reflex at the angle of $2\theta=20.11\pm0.5°$ divided by the intensity of the peaks at angle $2\theta=8.86\pm0.5°$ and $2\theta=15.08\pm0.5°$ from Mok$\alpha$1 X-Ray diffraction is in the range from 0.01 to 0.25.

The inventive process is carried out in an apparatus that comprises at least two reaction vessels hereinafter referred to as first reaction vessel and as second reaction vessel. Both reaction vessels are connected to each other, for example through a pipe system, preferably through at least two independent pipes. In addition, the apparatus contains at least one device for solid-liquid separation, for example by filtration or centrifuge, preferably by filtration.

In one embodiment of the present invention, the inventive process is carried out in an apparatus that comprises at least two tank reactors connected to each other with two pipes that are constructed in a way that slurry or aqueous solution may be transferred from a first reaction vessel to a second reaction vessel, and another pipe connected with a device for solid-liquid separation, and another pipe for transferring the liquid phase resulting from the solid-liquid-separation to the first reaction vessel, in whole or in part.

In one embodiment of the present invention, the second reaction vessel is equipped with a device through which liquid phase may be removed, for example a clarifier, a candle filter or a membrane. Said liquid phase may then be returned to step (a), in whole or in part.

In one version of the present invention, the first reaction vessel is embodied as a group of vessels, for example two or three tank reactors. In each reaction vessel of such group a reaction according to step (a) may be carried out, with the same combination of TM or with certain members only. The aqueous reaction media obtained in the various reaction vessels are than combined in order to subject them to step (b).

In one embodiment of the present invention, said first reaction vessel may have a device for discharging slurry or aqueous solution. For example, slurry or aqueous solution may be discharged through overflows or valves to the second reaction vessel.

In step (a), an aqueous slurry of metallic nickel and at least one metal selected from aluminum and transition metals other than nickel is combined with an oxidant selected from oxygen and nitrate in the first reaction vessel. Preferably, such transition metals other than nickel are selected from cobalt and manganese and combinations of cobalt and manganese.

The metallic nickel may be in the form of powder, sheets, turnings, briquettes, pellets, rounds, lumps, and electrode fragments. Powders may have an average particle diameter in the range of from 0.01 to 1 mm. Sheets may have a thickness in the range of from 0.1 t 5 mm and a length and breadth that may be identical or different, each in the range of from 2 cm to 10 meters, in particular from 2 to 10 cm. Turnings for the purposes of the present invention may have a thickness of from 0.1 to 1 mm, a width 1 mm to 5 mm and a length of from 1 cm to 20 cm. Lumps may have a diameter in the range of from 1 mm to 5 cm but with an irregular shape. Electrode fragments may have a thickness in the range of from 0.5 to 7 mm and an average diameter from 10 to 40 mm.

Rounds may have a diameter of 2 to 3 cm and a height of approximately 0.8 to 1.5 cm; briquettes with dimensions of:

length from 2 to 5 cm, breadth from 1 to 4 cm, height from 1 to 3 cm, and length bigger than height. For the purposes of the present invention, pellets have a diameter from 1 to 2 cm.

Aluminum and transition metals other than nickel may be in the form of powders, sheets, turnings, or lumps, with dimensions as defined above in the context of nickel.

The molar ratio of nickel to aluminum or transition metal, as the case may be, preferably corresponds to the stoichiometry of the desired product. In other embodiments, metals more noble than nickel are employed in a molar excess.

In one embodiment of step (a), the weight ratio of water to nickel and metals of TM other than nickel is in the range of from 20:1 to 0.1:1, preferably 10:1 to 0.5:1.

In step (a), an oxidant is present. Said oxidant is selected from oxygen and nitrate. nitrate may be introduced as alkali metal nitrate or as nitric acid. Oxygen is preferably present in the form of air.

In one embodiment of the present invention, step (a) is performed in the absence of oxygen, and the oxidation is performed by the use of alkali metal nitrate, for example sodium nitrate or potassium nitrate, or by the use of nitric acid or of a combination of nitric acid and alkali metal nitrate. Absence of oxygen shall mean a gas atmosphere with less than 10 ppm by vol. oxygen.

In one embodiment of the present invention a gas selected from oxygen, air or nitrogen is purged through the reaction medium in step (a) and nitrogen is purged through the reaction medium in step (b). In another embodiment of the invention, the gas flow rates are different in step (a) and step (b).

It is preferred to perform a mixing operation in step (a), for example stirring. On laboratory scale, shaking is possible as well.

Step (a) is performed at a temperature in the range of from 5 to 40° C., preferably in the range of from 15 to 35° C.

In one embodiment of the present invention, step (a) is performed at a pressure in the range of from 0.5 bar (abs.) to 10 bar (abs.), preferably—for simplicity reasons—at ambient pressure or at a pressure that is slightly higher than ambient pressure, for example 1 to 20 mbar higher than ambient pressure.

The duration—in case of a continuous mode the average hydraulic residence time—of aqueous medium in step (a) is in the range of from 30 minutes to 5 hours.

In one embodiment of the present invention, wherein step (a) is performed in the presence of a complexing agent selected from ammonia, borate, polyborate, glycine, tartrate, citrate, and oxalate. In a particular embodiment of the present invention, step (a) is performed in the presence of ammonia and a complexing agent selected from borate, polyborate, glycine, tartrate, citrate, and oxalate. In such embodiments, such complexing agent other than ammonia is present in the range of from 0.1 to 10 mol/mol nickel.

It is preferred to perform the inventive process in the presence of ammonia. Ammonia may be used as complexing agent and for pH adjustment. In addition, when nitrate is used as oxidant, ammonia is formed during step (a).

In one embodiment of the present invention, step (a) is performed in a single reaction vessel, for example in a stirred tank reactor. In another embodiment of the present invention, step (a) is performed in a group of reaction vessels, for example in two or up to 10 reaction vessels, also referred to as first reaction vessels or first group. Said first group of reaction vessels may comprise two or more tank reactors, for example up to 10 tank reactors. In each of the reaction vessels of the first group, the same or different metals of TM may be treated according the conditions according to step (a). For example, in one reaction vessel, nickel is combined with an oxidant at a temperature of from 5° to 40° C. in the presence of ammonia, and in another reaction vessel, cobalt or manganese or aluminum is combined with an oxidant at a temperature of from 5° to 40° C. in the presence of ammonia.

By performing step (a), an aqueous reaction medium is obtained. Said aqueous reaction medium may be in the form of a solution or of a slurry. In particular, said aqueous reaction medium is free from seed particles that might lead to a precipitation of hydroxide of TM. In particular, said aqueous reaction medium is free from precipitated manganese dioxide particles. Preferably, said reaction medium has a pH value in the range of from 7.5 to 10.0.

In step (b), said aqueous reaction medium is transferred from the first reaction vessel to a second reaction vessel. Said second reaction vessel contains a slurry of a hydroxide of TM. The temperature, at which step (b) is carried out, is in the range of from 45 to 80° C., preferably 55 to 70° C. The pH value in step (b) and thus in the second reaction vessel is higher than in step (a) and thus in the first reaction vessel, for example by 0.5 to six units, preferably by 1 to 3 units. In step (b), particles of hydroxide of TM are formed and grown.

In one embodiment of the present invention, the pH value in step (a) is in the range of from 7.0 to 10.0 and the pH value in step (b) is in the range of from 9.0 to 13.0.

In embodiments wherein in step (a) the pH value is 10, the pH value in step (b) is higher, for example at least 10.5, preferably at least 11. In embodiments wherein the pH value in step (b) is 9.0, the pH value in step (a) is lower, for example at most 8.5, preferably at most 8.0. More preferably, the pH value in step (b) is in the range of from 10.5 to 13.

Although it is preferred to have as little oxygen in step (b) as possible, step (b) may be performed under an atmosphere that contains up to 500 ppm $O_2$, preferred are up to 50 ppm $O_2$, even more preferred are at most 10 ppm. In the context of step (b), ppm refers to parts per million by volume.

In the second reaction vessel, hydroxide of TM is precipitated. In part, such hydroxide is formed on existing particles of hydroxide of TM, such existing particles serving as seed. Partially, however, new particles are formed in the course of step (b).

In one embodiment of the present invention, seed particles are added to the reaction vessel in step (b). In another embodiment of the present invention, seed particles are generated by attrition of existing secondary particles in the reactor in step (b) by integrated high shear equipment like rotor-stator devices.

In one embodiment of the present invention, step (b) is performed at a pH value in the range from 9 to 13, preferably in the range of 9.5 and 12.5. The limits are selected in a way that the pH value in step (b) is higher than in step (a).

In one embodiment of the present invention, metal particles are removed from the aqueous reaction medium of step (a) by filtration or sedimentation or magnetic separation and returned to the first reaction vessel. Magnetic separation steps will work for ferromagnetic metals such as cobalt and nickel. Said metal particles may have the size of metal as introduced in step (a) or be smaller, due to a partial but incomplete reaction.

In one embodiment of the present invention, step (b) is performed at a pressure in the range of from 0.5 bar (abs.) to 10 bar (abs.), preferably—for simplicity reasons—at ambient pressure or at a pressure that is slightly higher than ambient pressure, for example 1 to 20 mbar higher than ambient pressure.

The duration—in case of a continuous mode the average hydraulic residence time—of aqueous medium in step (b) is in the range of from 30 minutes to 15 hours.

It is preferred to prefer a mixing operation in the course of step (b), for example stirring.

In one embodiment of the present invention, the temperature during step (a) is lower than in step (b), for example by at least 5° C., preferably by at least 10° C. The maximum temperature difference of steps (a) and (b) may be in the range of from 40° C. In other embodiments, the temperature in steps (a) and (b are the same.

In the course of step (b), particulate hydroxide of TM slurried in its mother liquor, a liquid phase, is freshly formed, and existing particles of hydroxide of TM are grown. Without wishing to be bound by any theory, we believe that the higher the pH value in step (b) the higher is the share of freshly formed particles, and the lower is the share of particle growth. We further observe that the lower the pH value in step (b), the higher is the share of particle growth and the lower is the part of new particle formation.

In one embodiment of the present invention, neither in step (a) nor in step (b) any alkali metal hydroxide addition is required.

In one embodiment of the present invention, at least one compound of manganese or aluminum is added in step (b). Examples of compounds of manganese are $MnSO_4$ or $MnCl_2$ or preferably manganese (II) acetate or even more preferably $Mn(NO_3)_2$, water of hydratization being neglected. Examples of compounds of aluminum are $Al_2(SO_4)_3$, $KAl(SO_4)_2$, $Al(NO_3)_3$, and $NaAl(OH)_4$.

Step (c) includes removing the particles from step (b) from the liquid by a solid-liquid separation method and drying the particles so obtained. In particular, step (c) includes withdrawing slurry formed in step (b) and subjecting said slurry to a solid-liquid separation, for example decantation or centrifuge or filtration, filtration being preferred. Preferred embodiments of solid-liquid separation are filter presses and belt filters.

In a preferred embodiment of step (c), as solid phase, a filter cake is formed. As liquid phase, filtrate is obtained.

In one embodiment of the present invention, purification steps may be performed on the filter cake, for example rinsing with water or with aqueous ammonia, aqueous alkali metal solution or aqueous alkali carbonate solution. Magnetic separation steps may be performed as well, before or after drying, to remove unreacted nickel or cobalt or other ferromagnetic impurities like iron.

In preferred embodiments, the precursor is dried, for example under air at a temperature in the range of from 80 to 140° C. In other preferred embodiments, the precursor is dried, for example under air at a temperature in the range of from 80 to 140° C. and then under air at a temperature in the range of from 150 to 600° C.

In the course of step (c), the hydroxide of TM may be dried in one or several sub-steps, for example in at least two sub-steps at different temperatures, for example 80 to 150° C. in sub-step 1 and 165 to 600° C. in sub-step 2. Preferably, the residual moisture content of (oxy)hydroxides of TM is 5% by weight or below, for example 0.01 to 0.2% by weight. In the context of the present invention, the moisture content is calculated as g $H_2O$ per 100 g of (oxy)hydroxide of TM. In this case, $H_2O$ may be bound chemically as hydroxyl group, or be bound by physisorption. It is preferred that the residual moisture in hydroxide of TM is low, for example 0.1 to 5% by weight.

In one embodiment of the present invention, sub-step 1 is preferably performed in a spray dryer, in a fluidized-bed dryer, in a spin-flash dryer or in a contact dryer such as a paddle-dryer or pan-dryer. Sub-step 2 may be performed in a rotary kiln, a roller heath kiln or in a box kiln.

Said drying is performed in the presence of air, and this may lead to a partial oxidation. Especially manganese—if present—is partially oxidized to an oxidation stage of (+III) or even (+IV).

Step (d) includes returning liquid phase obtained in step (c) to the first reaction vessel, in whole or in part. In one embodiment of the present invention, 80 to 99 vol.-% of the liquid is returned to the first reaction vessel.

By performing the inventive process, precursors of an excellent morphology may be obtained, and the generation of by-products such as solution of $Na_2SO_4$ is extremely low. When combined with a source of lithium, for example LiOH or $Li_2CO_3$, and thermally treated at 600 to 1,000° C. in e.g., a rotary kiln or a roller hearth kiln, cathode active materials with good properties and morphology are obtained.

Another aspect of the present invention is related to particulate (oxy)hydroxides, hereinafter also referred to as inventive precursors. Inventive precursors are particulate (oxy)hydroxides of TM, wherein TM comprises nickel and at least one metal selected from cobalt and manganese and aluminum, and wherein inventive precursors further comprise at least one metal of TM in the oxidation state of zero, for example 0.1 to 10 mol-% referring to TM.

In one embodiment of the present invention, in XRD spectra of inventive precursors, the intensity of the reflex at the angle of $2\theta=20.11\pm0.5°$ divided by the intensity of the peaks at angle $2\theta=8.86\pm0.5°$ and $2\theta=15.08\pm0.5°$ from Mok$\alpha$1 X-Ray diffraction is in the range from 0.01 to 0.25.

In one embodiment of the present invention, inventive precursors are selected from hydroxides and oxyhydroxides of TM wherein TM is a combination of metals according to general formula (I)

$$(Ni_aCo_bMn_c)_{1-d}M_d \tag{I}$$

with a being in the range of from 0.6 to 0.95, preferably 80 to 94, b being in the range of from zero to 0.2, preferably 0.01 to 0.12, c being in the range of from zero to 0.2, preferably 0.02 to 0.10, d being in the range of from zero to 0.1, M is selected from Mg, Al, Ti, Zr, Mo, W, Al, Mg, Nb, and Ta, and combinations of at least two of the foregoing, preferably, M is selected from Mg and Al.

$$a+b+c=1,\ \text{and}\ c+d>\text{zero}.$$

Inventive precursors may contain traces of further metal ions, for example traces of ubiquitous metals such as sodium, calcium, iron or zinc, as impurities but such traces will not be taken into account in the description of the present invention. Traces in this context will mean amounts of 0.05 mol-% or less, referring to the total metal content of TM.

Particulate (oxy)hydroxide of TM is in particulate form. In one embodiment of the present invention, the mean particle diameter (D50) of inventive precursors is in the range of from 2 to 20 μm, preferably 3 to 16 μm, more preferably 7 to 14 μm. The mean particle diameter (D50) in the context of the present invention refers to the median of the volume-based particle diameter, as can be determined, for example, by light scattering. In one embodiment, inventive precursors have a monomodal particle diameter distribution. In other embodiments, the particle distribution of inventive precursors may be bimodal, for example with one maximum in the range of from 1 to 5 μm and a further maximum in the range of from 7 to 16 μm. Monomodal is preferred.

In another embodiment of the present invention the mean particle diameter (D50) of inventive precursors is in the range of from 1 to 7 μm, preferably 2 to 6 μm, more preferably 3 to 5 μm.

The particle shape of the secondary particles of inventive precursors is preferably spheroidal, that are particles that have a spherical shape. Spheroidal shall include not just those which are exactly spherical but also those particles with a form factor in the range of from 0.7 to 1 and an axis ratio of the bounding box in the range of from 1.00 to 1.25. To determine the axis ratio of the bounding box of a specific particle, the smallest possible, rectangular bounding box is set around the top view SEM image of a particle. The axis ratio is calculated from the length of the two sides $a_1$ and $a_2$ (with $a_1 \geq a_2$) by: axis ratio of the bounding box$=a_1/a_2$.

While a perfect sphere would possess an axis ratio of the bounding box of 1.0, all deviations from perfect sphericity lead to an axis ratio>1.0.

To determine form factor and axis ratio of samples, both properties are first determined for at least 50 individual particles of each sample and then averaged. The form factor of the individual particles is calculated from the perimeter and area determined from top view SEM images: Form factor$=(4\pi \cdot \text{area})/(\text{perimeter})_2$ While a perfect sphere would possess a form factor of 1.0, any deviation from perfect sphericity leads to form factors less than 1.0.

In one embodiment of the present invention, inventive precursors are comprised of secondary particles that are compose of primary particles. Preferably, said precursor is comprised of spherical secondary particles that are agglomerates of primary particles. Even more preferably, inventive precursor is comprised of spherical secondary particles that are agglomerates of plate-shaped, rod-shaped or needle-shaped primary particles or platelets.

Inventive precursors comprise a certain amount, for example 0.1 to 10 mol-% referring to TM, of metal in the oxidation state zero, for example nickel, said metal being a constituent of TM. Said metal in the oxidation state of zero and especially nickel is incorporated in the form of small particles of a maximum size of the particulate (oxy)hydroxide itself.

In one embodiment of the present invention, inventive precursors may have a particle diameter distribution span in the range of from 0.5 to 0.9, the span being defined as [(D90)−(D10)] divided by (D50), all being determined by LASER analysis. In another embodiment of the present invention, said precursor may have a particle diameter distribution span in the range of from 1.1 to 1.8.

In one embodiment of the present invention the specific surface (BET) of inventive precursors is in the range of from 2 to 10 $m^2/g$ or even 15 to 100 $m^2/g$, determined by nitrogen adsorption, for example in accordance with to DIN-ISO 9277:2003-05.

Preferably, inventive precursors display e.g., in SEM analyses, plate-shaped crystallites that are arranged in a way that their longest axis is in a 90 (±10°) angle with respect to the diameter of the secondary particles.

Inventive precursors are advantageously obtained according to the inventive process. They are excellently suited for making cathode active materials. Without wishing to be bound by any theory, we assume that minor amounts of metallic nickel as present in inventive precursors are easily oxidized during the reaction with source of lithium in an oxidizing atmosphere.

The inventive process is advantageously carried out in an apparatus that comprises (A) a first reaction vessel that comprises a stirrer and a pipe that is connected to (B) a second reaction vessel that comprises a stirrer and a pipe that is connected (C) a device for solid-liquid separation selected from filters and centrifuges, and an additional pipe through that the filtrate may be returned to reaction vessel (A).

In one embodiment of the present invention, the said apparatus comprises a group of 2 to 10 first reaction vessels (A) that each comprise a stirrer and a pipe that is connected to reaction vessel (B).

Preferred devices (C) are filters, for example belt filters.

In one embodiment of the present invention, the apparatus in which the inventive process is preferably carried out comprises at least two tank reactors (A) and (B) connected to each other with two pipes that are constructed in a way that slurry or aqueous solution may be transferred from tank reactor (A) to tank reactor (B), and another pipe connected with a device for solid-liquid separation (C), and another pipe for transferring the liquid phase to tank reactor (A), in whole or in part.

In one embodiment of the present invention, the said apparatus additionally contains a buffer device in which slurry from step (b) may be stored before performing step (c), or in which mother liquor may be stored before being returned to reaction vessel (A).

In one embodiment of the present invention, the second reaction vessel (B) is equipped with a device through which liquid phase may be removed, for example a clarifier, a candle filter or a membrane. Said liquid phase may then be returned to reaction vessel (A), in whole or in part.

In one version of the present invention, the first reaction vessel (A) is embodied as a group of vessels, for example two or three tank reactors. In each reaction vessel of such group a reaction according to step (a) may be carried out, with the same combination of TM or with certain members only. The aqueous reaction media obtained in the various reaction vessels (A) are than combined in order to subject them to the second reaction vessel (B).

The invention is further illustrated by a working example and a drawing.

A: reaction vessel (A), for step (a)

B: reaction vessel (B), for step (b)

C: Solid-liquid separation device to separate precursor from mother liquor (liquid phase)

D: Drying of filter cake

E: Solid-liquid separation to keep non-reacted metal in reaction vessel (B)

F: Solid-liquid separation for liquid phase withdrawal

Figure 2:
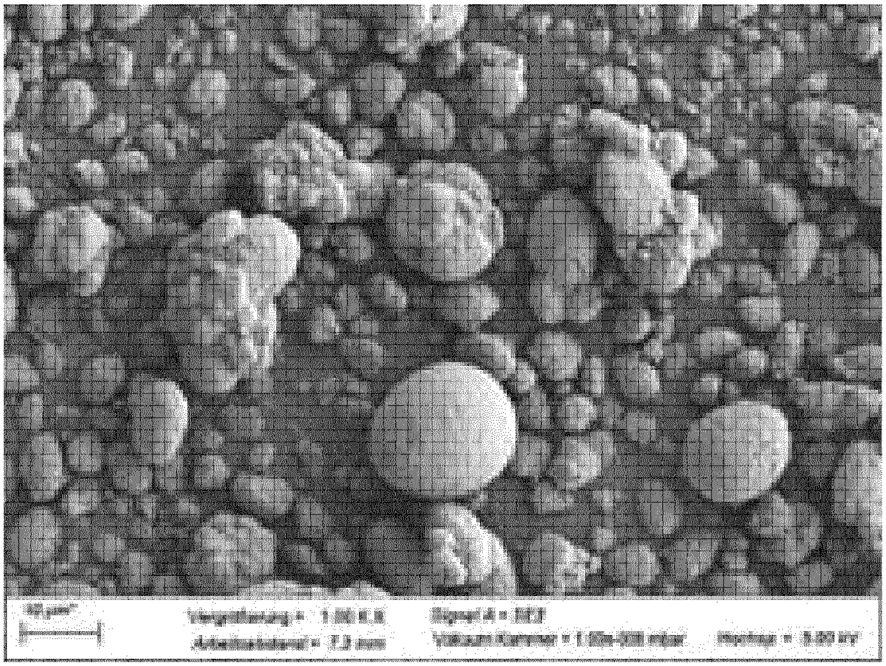
Figure 3:
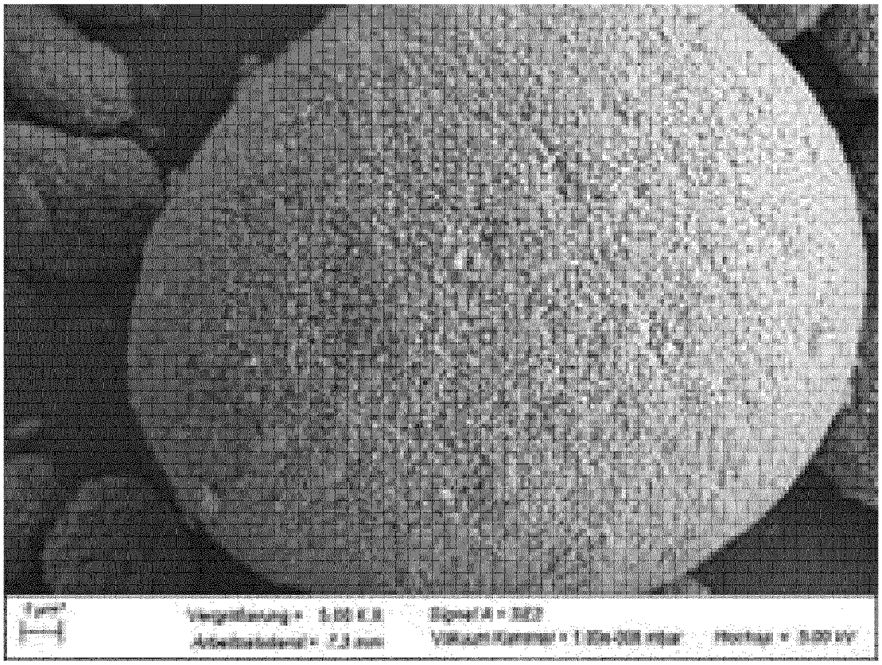
Figure 4:
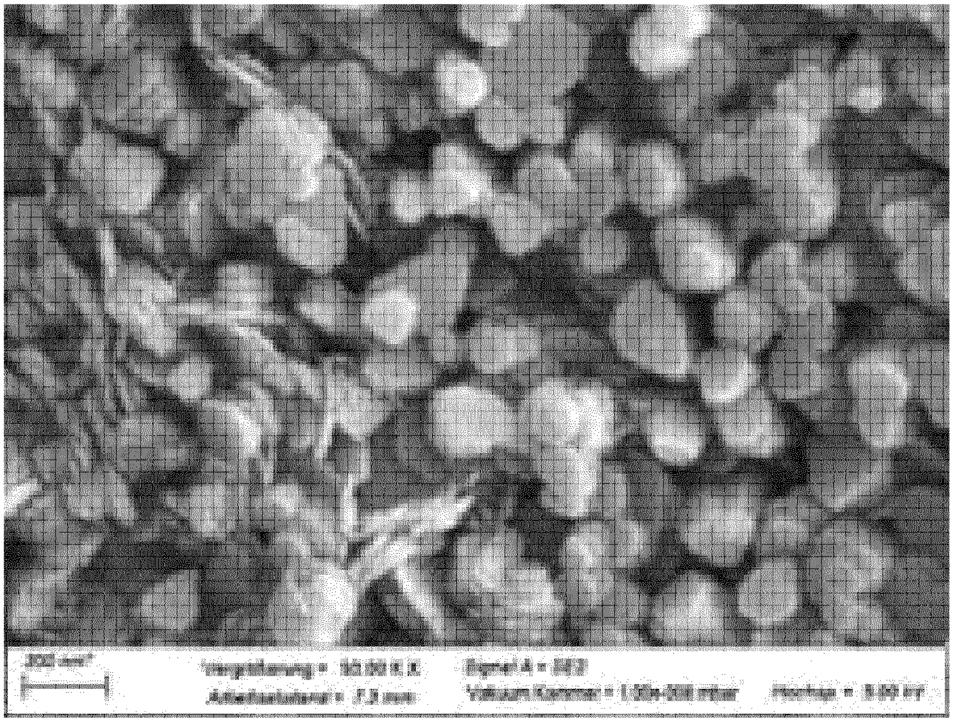

FIGS. 2 to 4: SEM pictures of p-CAM.1, different scales.

Figure 1:
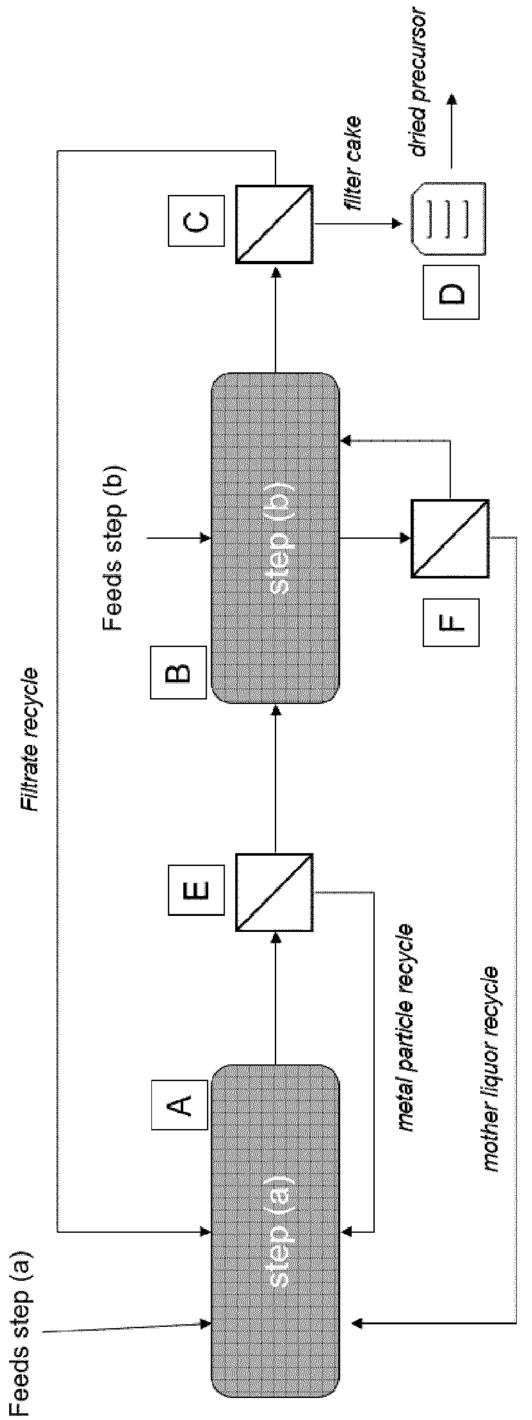
FIG. 1.

The below reaction is carried out in an apparatus according to the schematic FIG. 1. Reaction vessels (A.1) and (B.1) are 3.2-l stirred tank reactors.

rpm: revolutions per minute

Step (a.1): reaction vessel (A.1) is charged with an aqueous solution containing 1M ammonium nitrate and 0.5 M sodium nitrate. The solution is heated to 35° C. and the pH value is adjusted to 10.0 by addition of ammonia, and air is bubbled through the solution. Nickel and cobalt metal powder (average particle diameter 0.1 to 1 mm) is added, and the reaction mixture is stirred with 700 rpm. The solids content in reaction vessel (A.1) is 20 wt. %. The nickel to cobalt molar ratio in the solid is approx. 20:1. The suspension is filtered in device (E.1). Unreacted metal particles are recycled back into reaction vessel (A.1).

Step (b.1): the liquid phase is fed into reaction vessel (B.1) and heated to 60° C. In addition, nickel/cobalt/manganese hydroxide seeds and an aqueous manganese nitrate solution are fed into reaction vessel (B.1) in a way that the molar ratio Ni:Co:Mn in the liquid is 91:4.5:4.5. The solids content in B is roughly 20 wt. %. Nitrogen is bubbled through the slurry in reaction vessel (B.1). The pH value is adjusted to 12 by adding ammonia. Particle-free liquid phase is continuously withdrawn from reaction vessel B.1 by a solid-liquid-separator and fed back into reaction vessel (A.1) to a degree of 90%. In parallel liquid phase withdrawal, the forming suspension is continuously discharged from the reaction vessel (B.1). Residual metal particles are partially removed by magnetic separation. The suspension is then filtered in a filter C.1. The liquid phase is recycled back into reaction vessel (A.1). The filter cake is washed with deionized water and dried at 120° C. for 16 h in D.1 to obtain the inventive precursor P-CAM.1 with molar composition of Ni:Co:Mn=91:4.5:4.5 and an average particle size (d50)= 11.8 μm and span=1.24. P-CAM.1 contains some unreacted nickel.

Powder X-ray Diffraction (PXRD) data is advantageously collected using a laboratory diffractometer (D8 Discover, Bruker AXS GmbH, Karlsruhe). The diffractometer is set up with a Molybdenum X-ray tube. The characteristic K-alpha1 radiation is monochromatized using a bent Germanium Johansson type primary monochromator. Data is collected in the Bragg-Brentano reflection geometry. A LYNXEYE area detector is utilized to collect the scattered X-ray signal.

p-CAM.1 is ground using an IKA Tube Mill and an MT40.100 disposable grinding chamber. The powder was placed in a sample holder and flattened using a glass plate.

P-CAM.1 is mixed with LiOH monohydrate in a molar ratio Li/TM of 1.02 to obtain a mixture. In a muffle oven, the mixture is heated to 760° C. and kept for 10 hours in a forced flow of a mixture of oxygen. After cooling to ambient temperature, the powder was deagglomerated and sieved through a 32 μm mesh to obtain the cathode active material CAM 1. No metallic nickel is detected any more.

The D50 of the electrode active material B-CAM.1 is 11.8 μm, determined using the technique of LASER diffraction in a Mastersize 3000 instrument from Malvern Instruments.

The invention claimed is:

1. A particulate (oxy)hydroxide of TM selected from the group consisting of hydroxides and oxyhydroxides of TM, wherein TM comprises nickel and at least one metal selected from the group consisting of cobalt and manganese and aluminum, and wherein said particulate (oxy)hydroxide of TM further comprises 0.1 mol-% to 10 mol-% referring to TM of metal of TM in an oxidation state of zero, wherein the particulate (oxy)hydroxide of TM is comprised of secondary particles that are each individually composed of primary particles, and wherein the metal of TM in the oxidation state of zero is incorporated in the particulate (oxy)hydroxide of TM in the form of particles having a maximum size of the particulate (oxy)hydroxide itself.

2. The particulate (oxy)hydroxide according to claim 1 comprising 0.1 mol-% to 10 mol-% of metal in the oxidation state zero, wherein said metal is nickel, and wherein the percentages refer to TM.

3. A process for making a particulate (oxy)hydroxide of TM, of claim 1 wherein said process comprises the steps of:

(a) combining an aqueous slurry of metallic nickel and at least one metal selected from the group consisting of aluminum and transition metals other than nickel in the presence of ammonia with an oxidant selected from the group consisting of oxygen and nitrate in a first reaction vessel or in a first group of reaction vessels at a temperature of from 5° C. to 40° C., (b) transferring aqueous reaction medium from step (a) to a second reaction vessel, wherein said second reaction vessel contains a slurry of a hydroxide of TM, wherein a pH value in step (b) is higher than a pH value in step (a) and a temperature is in a range of from 45° C. to 80° C., thereby forming and growing particles of hydroxide of TM, (c) removing the particles from step (b) from the liquid by a solid-liquid separation method, and drying the particles, and (d) returning liquid phase obtained in step (c) to the first reaction vessel.

4. The process according to claim 3, wherein the particulate (oxy)hydroxide is selected from the group consisting of hydroxides and oxyhydroxides of TM, wherein TM is a combination of metals according to general formula (I)

$$(Ni_aCo_bMn_c)_{1-d}M_d \qquad (I)$$

with a being in a range of from 0.6 to 0.95, b being in a range of from zero to 0.2, c being in a range of from zero to 0.2, d being in a range of from zero to 0.1, M is selected from the group consisting of Mg, Al, Ti, Zr, Mo, W, Al, Mg, Nb, and Ta, $$a+b+c=1, \text{ and}$$

$$c+d > \text{zero}.$$

5. The process according to claim 3, wherein step (a) is performed in a presence of a complexing agent selected from the group consisting of ammonia, borate, polyborate, glycine, tartrate, citrate, and oxalate.

6. The process according to claim 4, wherein M is Al, and wherein zero<c≤0.1.

7. The process according to claim 3, wherein between steps (a) and (b), metal particles are removed from the aqueous reaction medium of step (a) by filtration or sedimentation or magnetic separation and returned to the first reaction vessel.

8. The process according to claim 3, wherein step (b) is performed under an atmosphere that contains up to 500 ppm $O_2$.

9. The process according to claim 3, wherein step (a) is performed in an absence of oxygen.

10. The process according to claim 3, wherein in step (b), a compound of manganese or aluminum is added.

11. The process according to claim 3, wherein in step (d), 80 vol.-% to 95 vol.-% of the liquid phase from step (c) is returned to the first reaction vessel.

12. The process according to claim 3, wherein steps (a) and (b) are both performed without addition of alkali metal hydroxide.

13. The process according to claim 3, wherein the pH value in step (a) is in a range of from 7.0 to 10.0, and wherein the pH value in step (b) is in a range of from 9.0 to 13.0.

* * * * *